US012577078B2

(12) United States Patent
Kodama

(10) Patent No.: US 12,577,078 B2
(45) Date of Patent: Mar. 17, 2026

(54) IMAGE FORMING APPARATUS

(71) Applicant: CANON KABUSHIKI KAISHA, Tokyo (JP)

(72) Inventor: Shutaro Kodama, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/931,437

(22) Filed: Oct. 30, 2024

(65) Prior Publication Data

US 2025/0153970 A1 May 15, 2025

(30) Foreign Application Priority Data

Nov. 13, 2023 (JP) ................................ 2023-192795

(51) Int. Cl.
*B65H 43/04* (2006.01)
*B65H 7/06* (2006.01)
*G03G 15/00* (2006.01)
*G03G 15/23* (2006.01)

(52) U.S. Cl.
CPC ............... *B65H 43/04* (2013.01); *B65H 7/06* (2013.01); *G03G 15/231* (2013.01); *G03G 15/6573* (2013.01)

(58) Field of Classification Search
CPC ........ B65H 42/04; B65H 7/06; G03G 15/231; G03G 15/6573
See application file for complete search history.

(56) References Cited

U.S. PATENT DOCUMENTS

2024/0417208 A1* 12/2024 Morohashi ........... B65H 3/0684

FOREIGN PATENT DOCUMENTS

| | | | |
|---|---|---|---|
| JP | H09-012176 | A | 1/1997 |
| JP | H10-157920 | A | 6/1998 |
| JP | 2010-126264 | A | 6/2010 |
| JP | 2021-123470 | A | 8/2021 |

OTHER PUBLICATIONS

JP H0912176 Machine Translation (Year: 1997).*

* cited by examiner

*Primary Examiner* — David H Banh
(74) *Attorney, Agent, or Firm* — Venable LLP

(57) ABSTRACT

An image forming apparatus includes a first conveying portion provided with a discharge opening, a second conveying portion, a switching unit switched between a first state in which a recording medium is guided to the first conveying portion and a second state in which the recording medium is guided to the second conveying portion, a detecting unit provided in the discharge opening and for detecting the recording medium, a controller for controlling the switching unit, and a discriminating unit for discriminating that the switching unit is abnormal in a case where after the switching unit is controlled by the controller so as to be switched to the second state, a time from a start of detection of the recording medium by the detecting unit to an end of the detection is within a predetermined period.

9 Claims, 9 Drawing Sheets

IMAGE FORMING APPARATUS

FIELD OF THE INVENTION AND RELATED ART

The present invention relates to an image forming apparatus.

Conventionally, an image forming apparatus such as a printer or a copying machine has a constitution including a plurality of conveying paths, such as a discharge opening for permitting discharge of a sheet to an outside of the image forming apparatus, a conveying path for turning the sheet upside down, and the like. The image forming apparatus switches a conveying destination by using a conveying path switching mechanism in order to convey the sheet to a designated conveying path. This switching mechanism switches the conveying destination of the sheet by switching a state of the switching mechanism in a position where the conveying path branches off in the plurality of conveying paths thereon. In the case where this switching mechanism is in failure (out of order), there is a possibility that the sheet is conveyed to the conveying path different from the designated conveying path. Further, on a designated conveying path side, the sheet does not come, and therefore, a sheet jam is notified. For that reason, there is a problem such that the sheet jam is notified to a user or a service person in a state in which the switching mechanism is in failure. It is difficult that the user or the service person specifies that the conveying path switching mechanism is failure, from contents of the notification. Further, sheet jam clearance is instructed from an operation panel of the image forming apparatus, but the sheet does not exist in the designated conveying path, so that the user has to check the conveying path unnecessarily. Therefore, this leads to a lowering in usability due to erroneous detection of the sheet jam. On the other hand, for example, in Japanese Laid-Open Patent Application No. Hei 10-157920, control such that conveyance of the sheet to the conveying path different from the designated conveying path is discriminated by a change in sensor positioned in a conveying path destination is proposed.

SUMMARY OF THE INVENTION

A principal object of the present invention is to suppress erroneous detection of abnormality of a switching mechanism.

According to an aspect of the present invention, there is provided an image forming apparatus comprising: a first conveying portion provided with a discharge opening and configured to convey a recording medium; a second conveying portion configured to convey the recording medium in a direction different from a direction by the first conveying portion; a switching unit switched between a first state in which the recording medium is guided to the first conveying portion and a second state in which the recording medium is guided to the second conveying portion; a detecting unit provided in the discharge opening and configured to detect the recording medium; a controller configured to control the switching unit; and a discriminating unit configured to discriminate that the switching unit is abnormal in a case where after the switching unit is controlled by the controller so as to be switched to the second state, a time from a start of detection of the recording medium by the detecting unit to an end of the detection is within a predetermined period.

Further features of the present invention will become apparent from the following description of exemplary embodiments with reference to the attached drawings.

Figure 4:
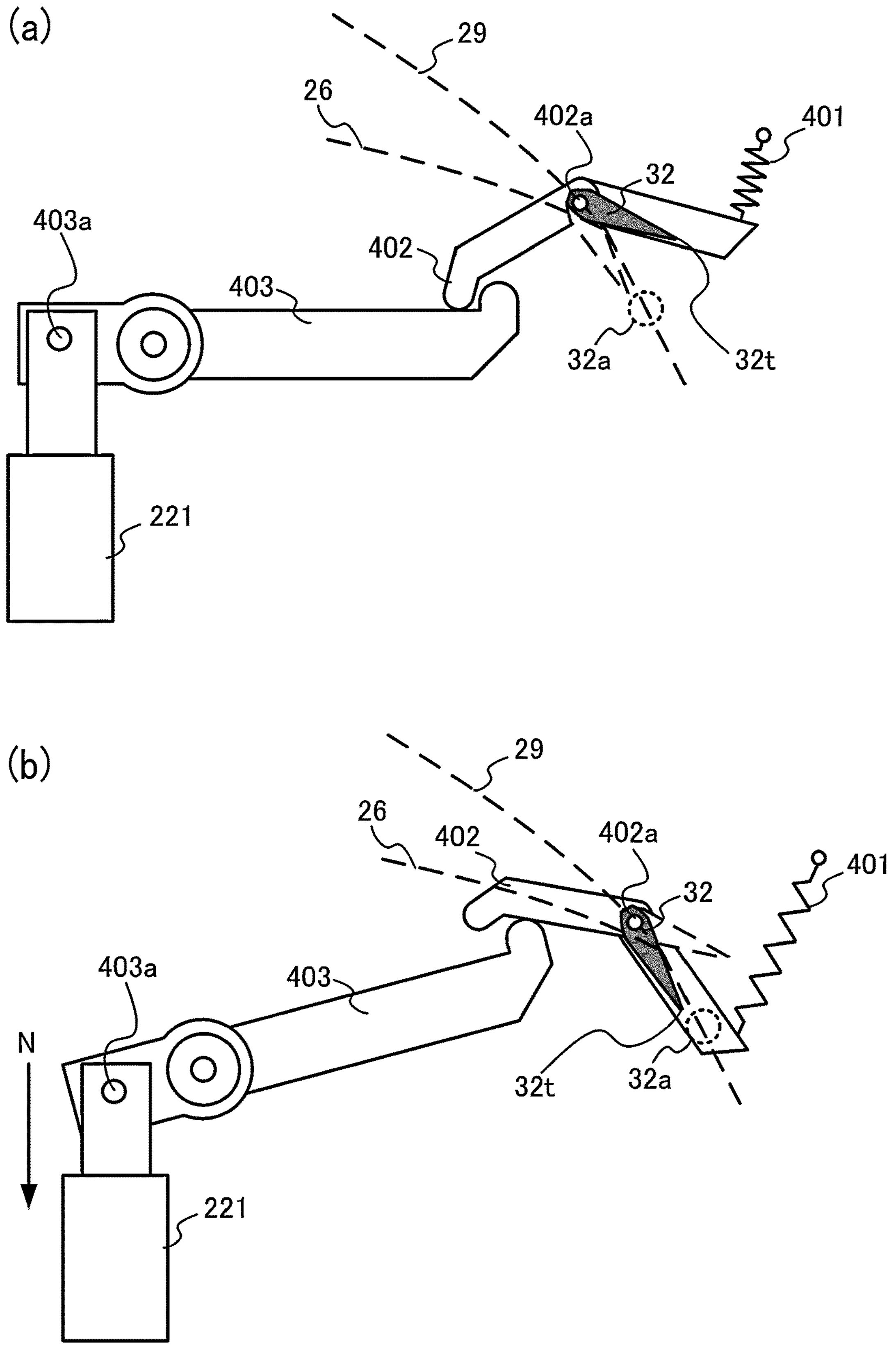

Part (a) and (b) of FIG. 4 are schematic views for illustrating an outline of a conveying path switching portion in the embodiments 1 and 2.

Figure 5:
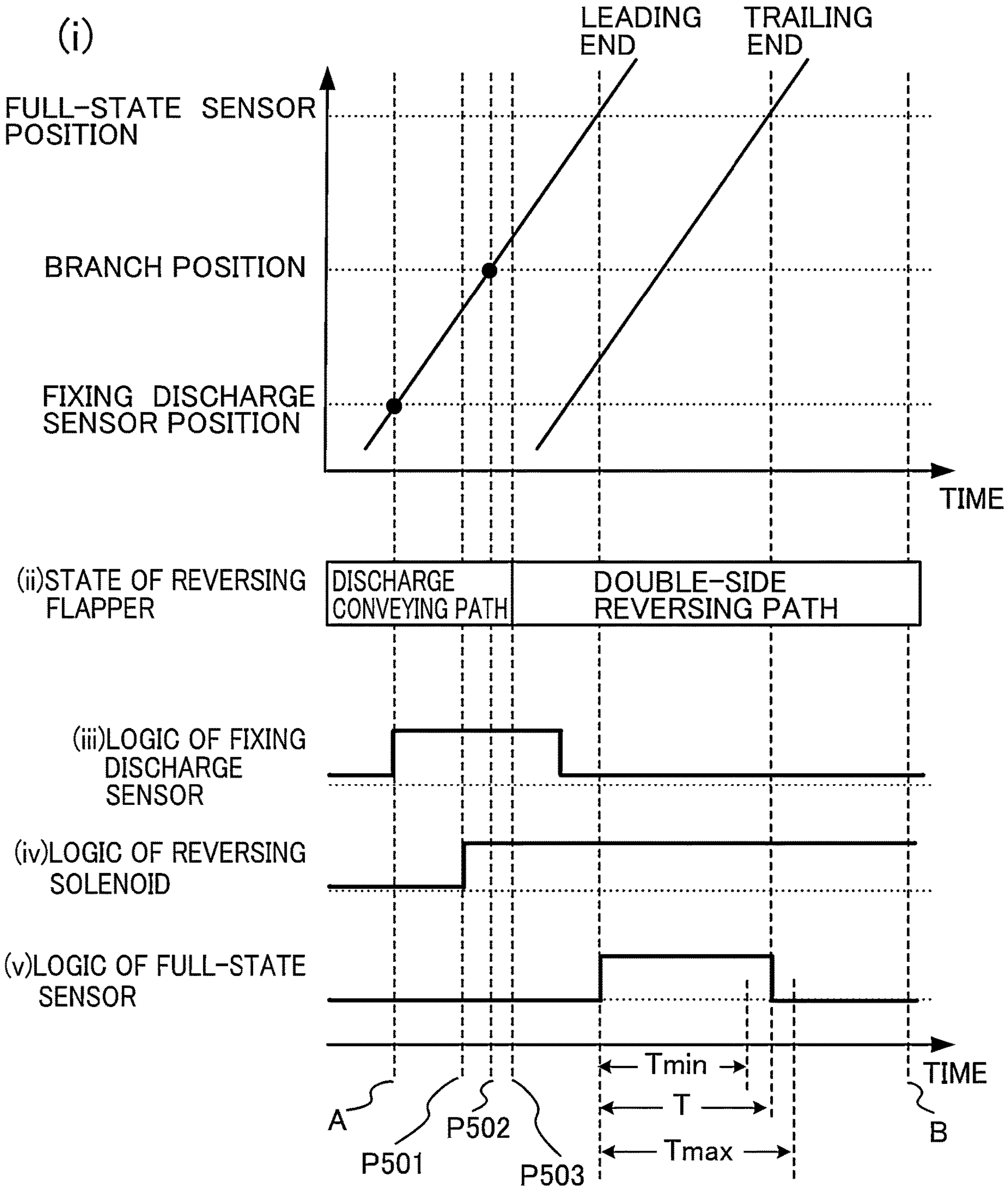

FIG. 5 is a timing chart for illustrating switching abnormality discrimination in the embodiment 1.

Figure 6:
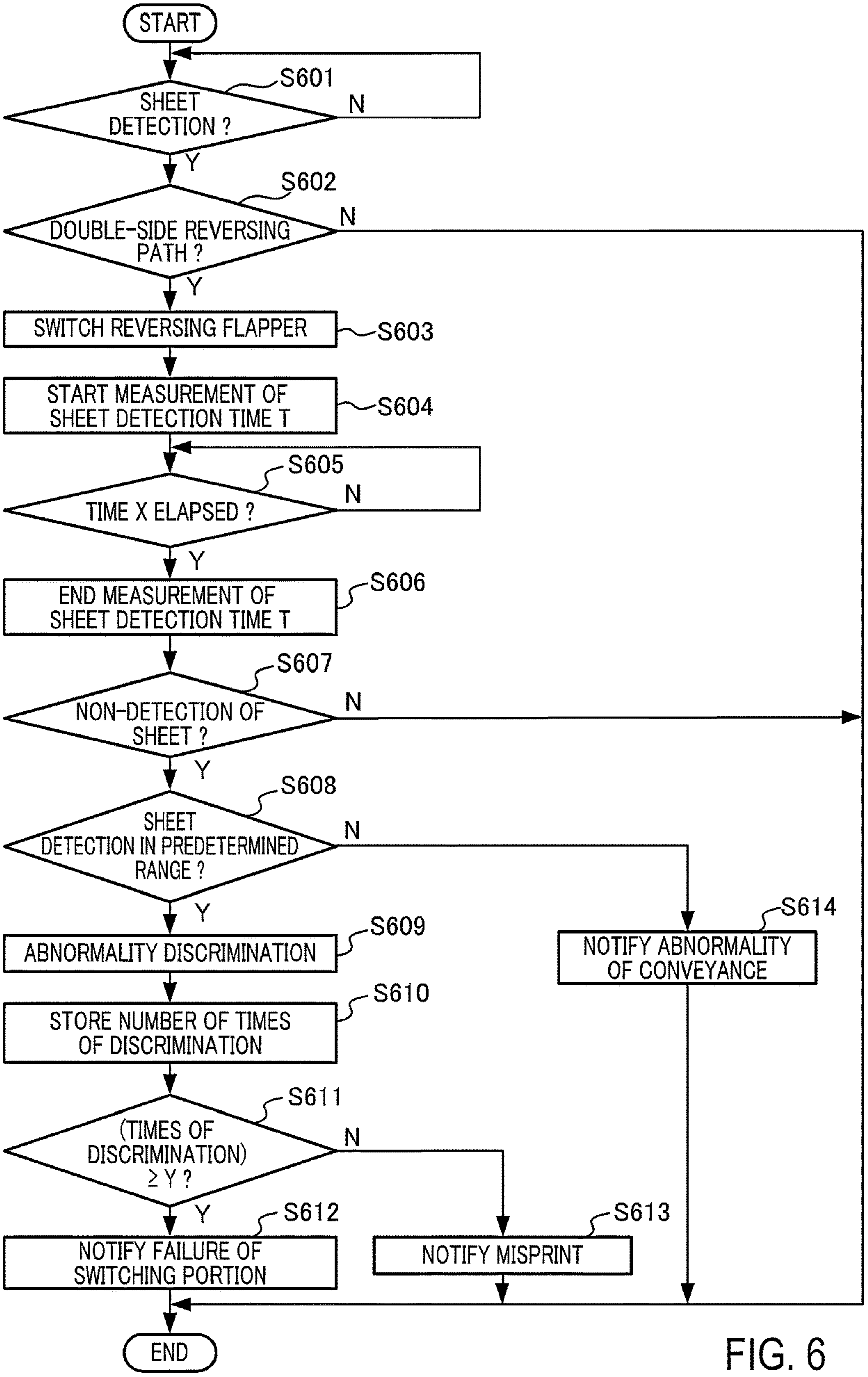

FIG. 6 is a flowchart showing switching abnormality discrimination processing in the embodiment 1.

Figure 7:
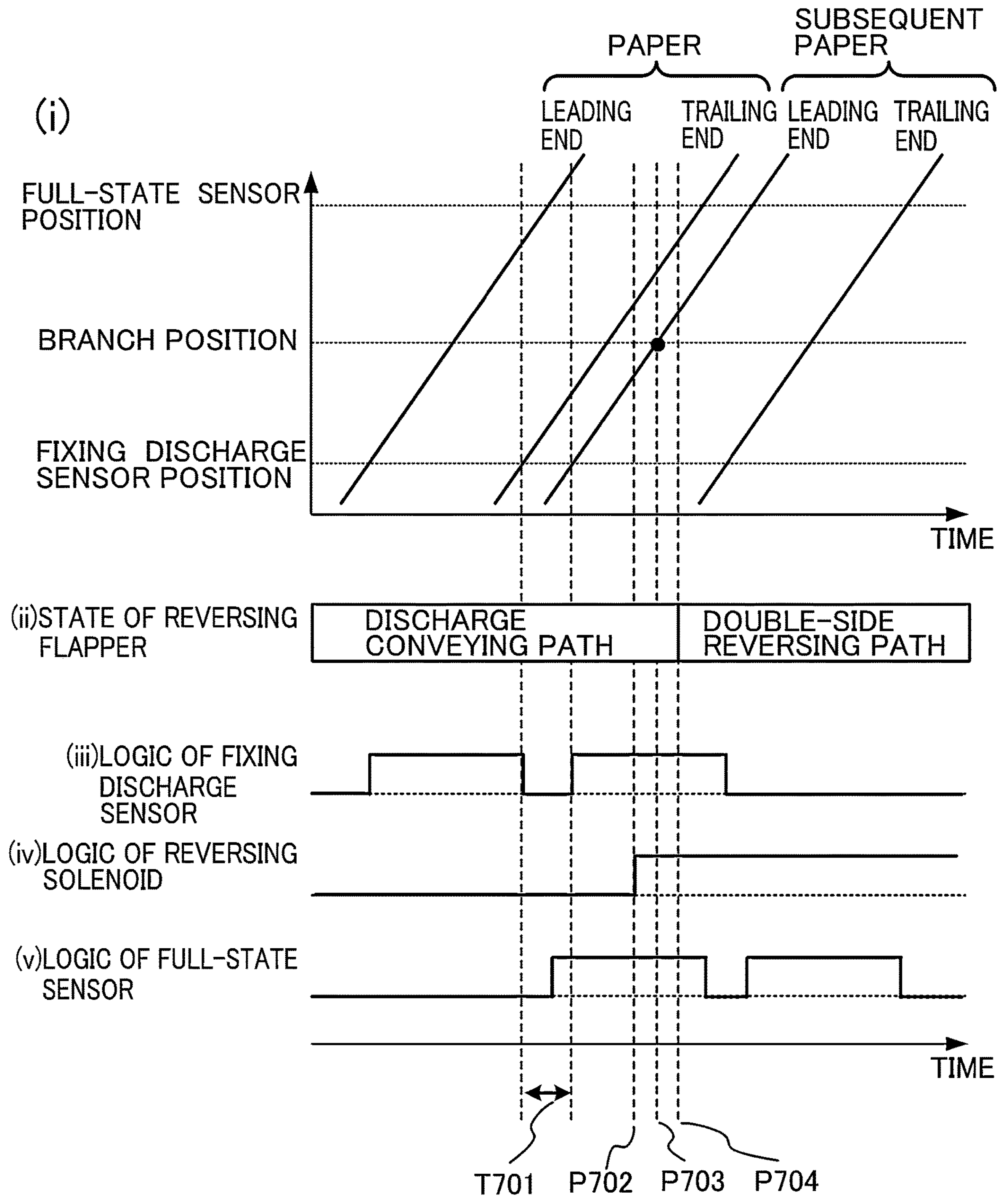

FIG. 7 is a timing chart for illustrating control carried out by the conveying path switching portion at the time of abnormality in the embodiment 2.

Figure 8:
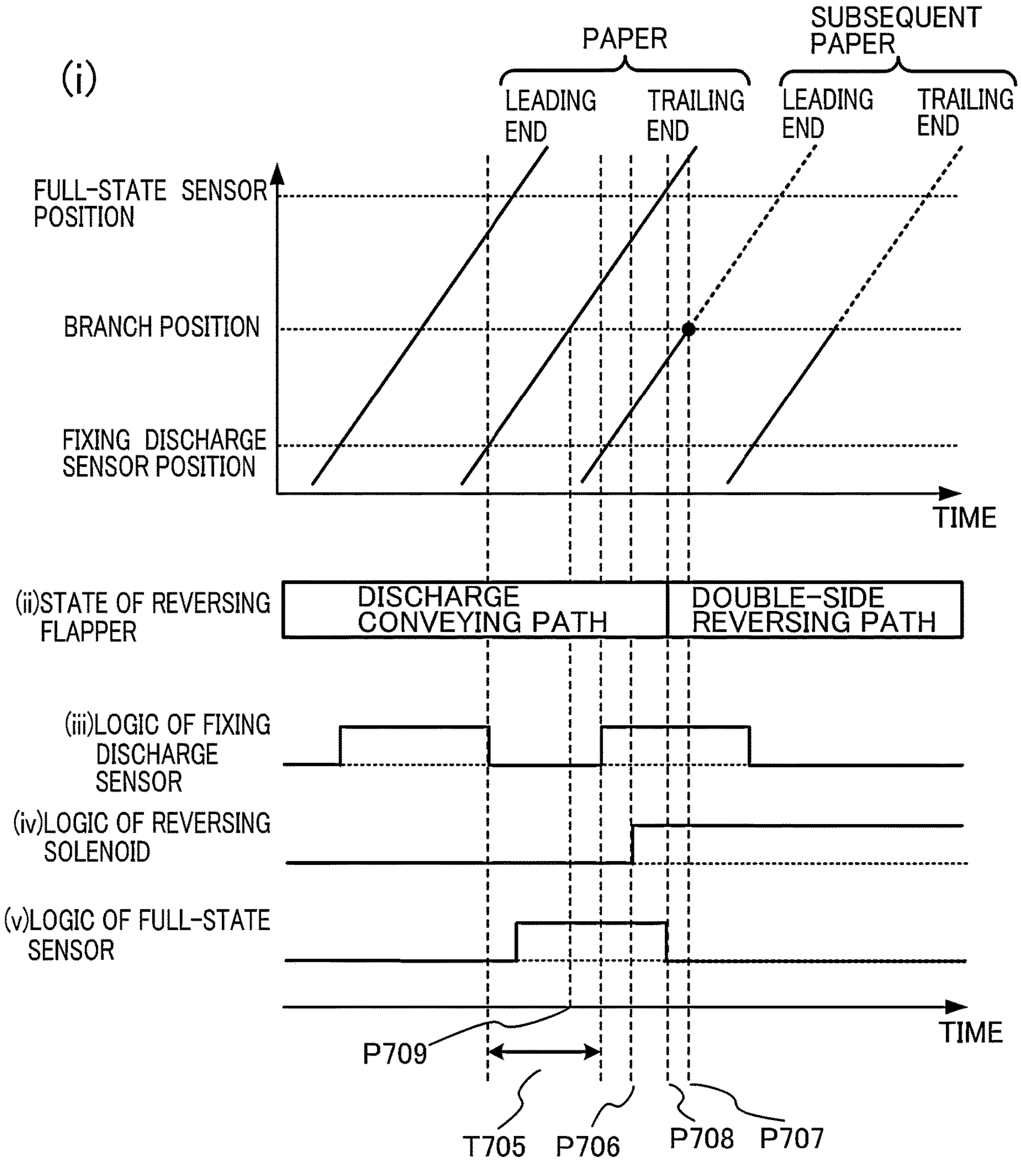

FIG. 8 is a timing chart for illustrating control carried out by the conveying path switching portion at the time of abnormality in the embodiment 2.

Figure 9:
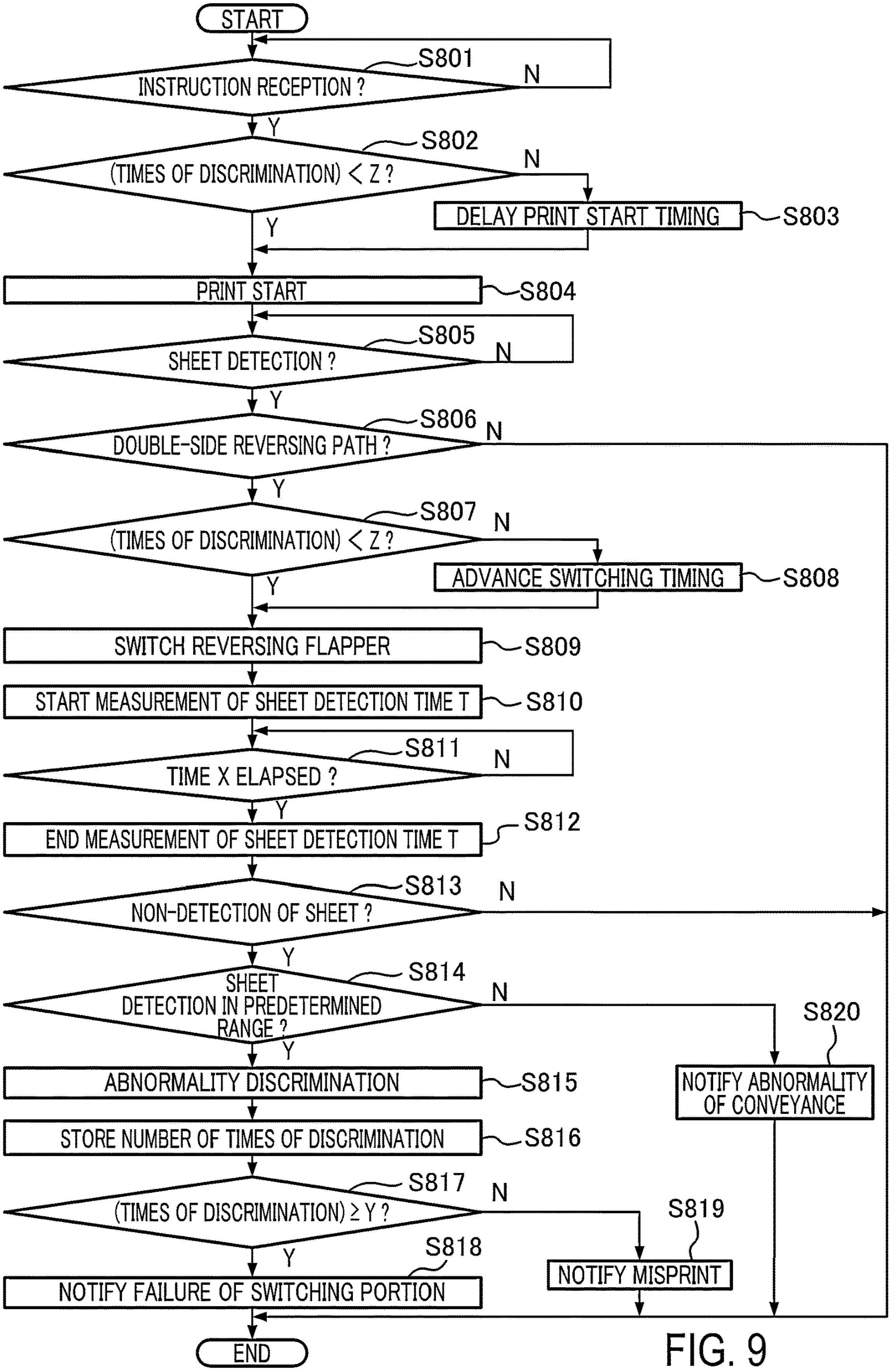

FIG. 9 is a flowchart showing switching abnormality discrimination processing in the embodiment 2.

DESCRIPTION OF THE EMBODIMENTS

Embodiment 1

In the following, an embodiment 1 to which the present invention is applicable will be described. An outline of a general constitution of a laser printer engine as an image forming apparatus.

<Image Forming Apparatus>

A laser printer 100 (hereinafter, simply referred to as a printer 100) forms electrostatic latent images by image light formed on the basis of an image signal sent from a controller (not shown), and forms a color visible image by developing the electrostatic latent images and then by transferring resultant visible images in a superposition manner. The printer 100 transfers the color visible image onto a sheet 2 as a recording medium fed from a cassette 1 by a sheet (paper) feeding roller 40, and fixes the color visible image on the sheet 2. An image forming portion is constituted, for each station, by photosensitive drums 5Y, 5M, 5C, and 5K, charging portions 7Y, 7M, 7C, and 7K, developing portions 8Y, 8M, 8C, and 8K, and an intermediary transfer belt 12, which are juxtaposed correspondingly to developing colors. The photosensitive drums 5Y, 5M, 5C, and 5K, the charging portions 7Y, 7M, 7C, and 7K, and the developing portions 8Y, 8M, 8C, and 8K are mounted in process cartridges 22Y, 22M, 22C, and 22K, respectively, detachably mountable to a main assembly of the printer 100.

Each of the photosensitive drums 5Y, 5K, 5C, and 5K is constituted by applying an original photoconductor layer on an outer periphery of an aluminum cylinder and is rotated by transmission of a driving force of a driving motor (not shown) thereto. The driving motor rotates each of the photosensitive drums 5Y, 5M, 5C, and 5K in the clockwise direction depending on an image forming operation. Exposure light to the photosensitive drums 5Y, 5M, 5C, and 5K is sent from scanner portions 10Y, 10M, 10C, and 10K, respectively, and thus surfaces of the photosensitive drums 5Y, 5M, 5C, and 5K are selectively exposed to light, so that electrostatic latent images are formed.

The printer 100 has a constitution in which four charging portions (injection chargers) for electrically charging the photosensitive drums 5Y, 5M, 5C, and 5K of yellow (Y), magenta (M), cyan (C), and black (K), respectively, are provided in the stations. The charging portions 7Y, 7M, 7C, and 7K are provided with sleeves 7YS, 7MS, 7CS, and 7KS, respectively. The printer 100 has a constitution in which four developing portions 8Y, 8M, 8C, and 8K for developing the electrostatic latent images for yellow (Y), magenta (M), cyan (C), and black (K), respectively, are provided for visualizing the electrostatic latent images. The developing portions 8Y, 8M, 8C, and 8K are provided with sleeves 8YS, 8MS, 8CS, and 8KS, respectively. Each of the developing portions 8Y, 8M, 8C, and 8K is mounted detachably mountable to the associated process cartridge.

The intermediary transfer belt 12 contacts the photosensitive drums 5Y, 5M, 5C, and 5K and is rotated in the counterclockwise direction during color image formation with rotation of the photosensitive drums 5Y, 5M, 5C, and 5K. Onto the intermediary transfer belt 12, the visible images are transferred by a primary transfer voltage applied to primary transfer rollers 4Y, 4M, 4C, and 4K (primary transfer). The intermediary transfer belt 12 nips and conveys the sheet 2 in a position of a secondary transfer roller 9, thereby to transfer the color visible image onto the sheet 2 in a superposition manner (secondary transfer). The intermediary transfer belt 12 is nipped in a secondary transfer portion by the secondary transfer roller 9 and an opposite roller 18.

A fixing portion 13 is for fixing a transferred unfixed color visible image while conveying the sheet 2 and is provided with a fixing roller 14 for heating the sheet 2 and a pressing roller 15 for causing the sheet 2 to press-contact the fixing roller 14. Each of the fixing roller 14 and the pressing roller 15 is formed in a hollow shape, and a heater is incorporated inside the fixing roller 14. That is, the sheet 2 on which the color visible image is held is conveyed by the fixing roller 14 and the pressing roller 15, and in addition, toner is fixed on a surface of the sheet 2 under application of heat and pressure. The sheet 2 after fixing of the visible image is conveyed to a discharge conveying path 26 as a first conveying portion and is discharged to a discharge portion by a discharge conveying roller pair 31, so that the image forming operation is ended. The discharge conveying path 26 is constituted by a first guiding member provided with a guiding rib. Further, a full-state sensor 39 as a detecting unit (first detecting unit) positioned in the discharge portion is a sensor for detecting that a sheet bundle on a discharge tray 27 is in a full state. Here, the full state is a state in which the sheet bundle is stacked in a manner such that a stacking height sheet bundle on a discharge tray 27 exceeds an allowable height for the discharge tray 27. In the case where the sheet bundle is not the full state, the full-state sensor 39 detects from a leading end to a trailing end of the conveyed sheet 2 for every discharge of the sheet 2. Incidentally, in the conveying path, a registration sensor 19, a fixing discharge sensor 20, a double-side conveyance sensor 28 as a second detecting unit which are capable of detecting the leading end and the trailing end of the conveyed sheet 2 are provided. On a side upstream of the registration sensor 19 with respect to a (sheet) conveying direction, a registration roller pair 3 is provided.

(Double-Side Printing)

Figure 1:
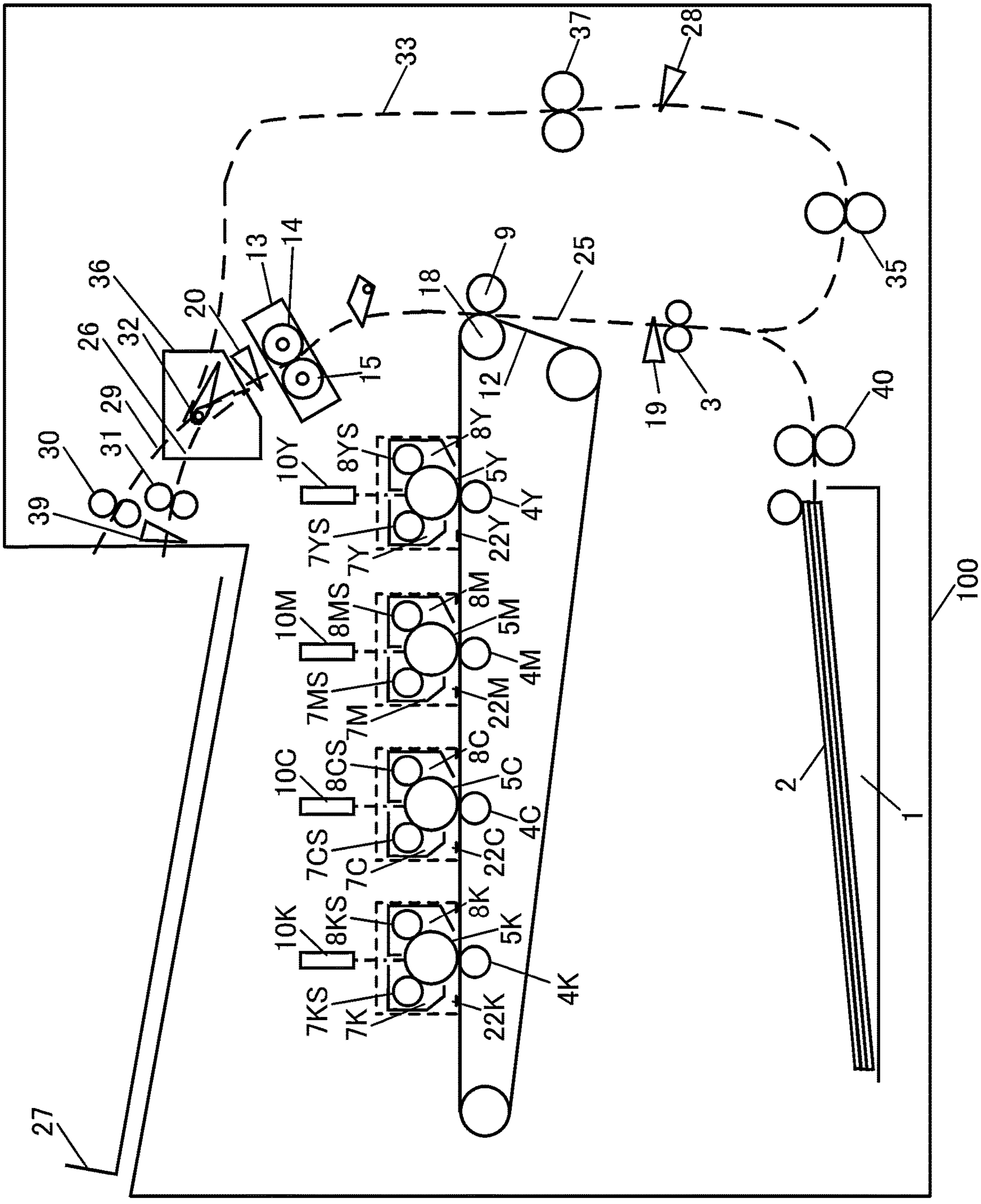
FIG. 1 is a schematic sectional front view showing a general constitution of an image forming apparatus according to embodiments 1 and 2.

Next, double-side conveyance control when printing of images on a front surface (side) and a back surface (side) of the sheet 2 is made will be described. The sheet 2 on which front surface the image is printed and which passes through the fixing portion 13 is conveyed to a position of a conveying path switching portion 36. The conveying path switching portion 36 switches a reversing flapper 32 as a switching unit, and conveys the sheet 2 to a double-side reversing path 29 as a second conveying portion (double-side reversing passage). The double-side reversing path 29 is constituted by a second guiding member provided with a guiding rib. Incidentally, in FIG. 1, the reversing flapper 32 when the sheet 2 is conveyed to the discharge conveying path 26 is indicated by a solid line, and the reversing flapper 32 when the sheet 2 is conveyed to the double-side reversing path 29 is indicated by a broken line. Switching of a position of the reversing flapper 32 from a position of the solid line to a position of the broken line or from the position of the broken line to the position of the solid line is also expressed as switching of a state of the reversing flapper 32.

When the trailing end of the sheet 2 reaches the double-side reversing path 29, a rotational direction of a reversing roller pair 30 is switched by a motor (not shown), so that the sheet 2 is conveyed toward a double-side conveying path 33 as a third conveying path. The sheet 2 of which conveying direction is reversed is conveyed along the double-side conveying path 33 by a double-side conveying roller pair 37 and a double-side re-(sheet) feeding roller pair 35. Then, the sheet 2 enters a print conveying path 25 again in a state in which the sheet 2 is turned upside down (reversed), followed by toner image transfer and fixing onto the back surface (side), and then the sheet 2 is discharged to the discharge portion.

<Hardware Component Diagram>

Figure 2:
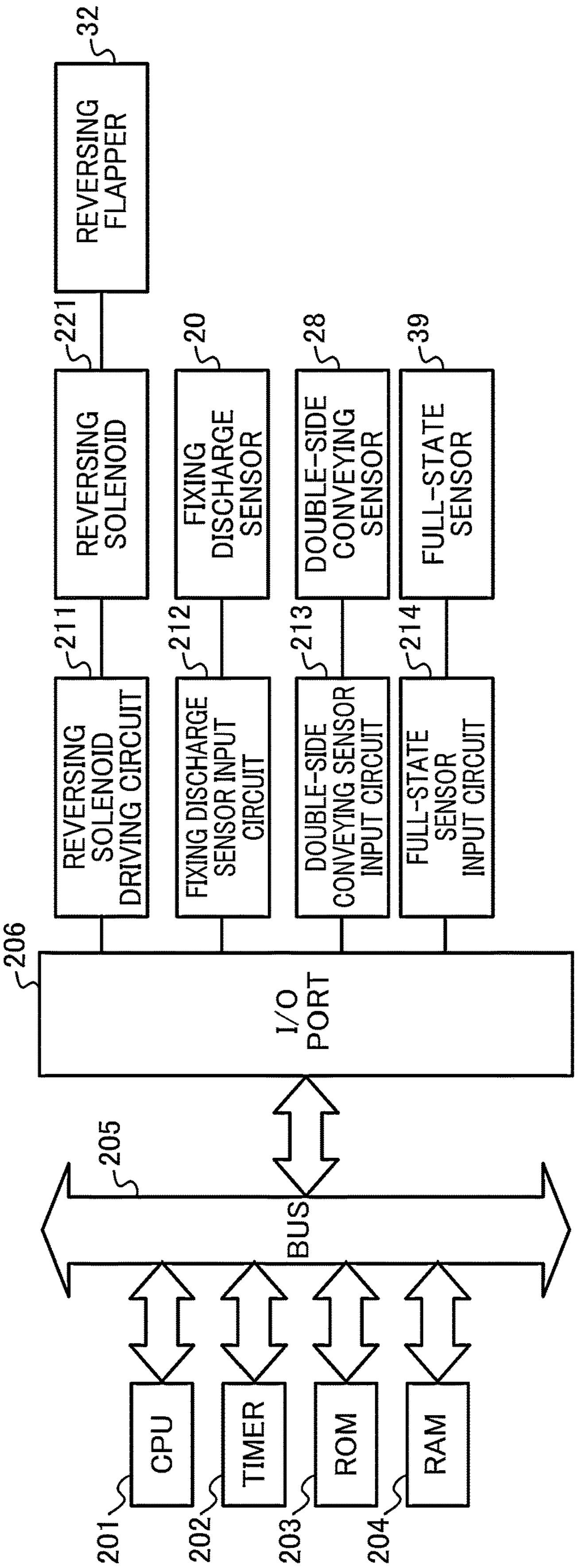
FIG. 2 is a hardware component diagram in the embodiments 1 and 2.

FIG. 2 is a hardware component diagram in the embodiment 1. The printer 100 includes a CPU (Central Processing Unit) 201, a timer 202, a ROM (Read Only Memory) 203, a RAM (Random Access Memory) 204, and an I/O port 206. The CPU 201 controls entirety of the printer 100. The timer 202 generates a control timing. The ROM 203 stores a control program. The RAM 204 stores data or the like. The I/O port 206 is connected to the CPU 201, the timer 202, the ROM 203, and the RAM 204 via a bus 205.

The I/O port 206 is connected to a driving circuit 211 of a reversing solenoid 221, an input circuit 212 of the fixing discharge sensor 20, an input circuit 213 of the double-side conveyance sensor 28, and an input circuit 214 of the full-state sensor 39. The driving circuit 211 of the reversing solenoid 221 drives the reversing solenoid 221 in interrelation with the reversing flapper 32. The input circuit 212 of the fixing discharge sensor 20 inputs a logic of the fixing discharge sensor 20 to the I/O port 206. The input circuit 213 of the double-side conveyance sensor 28 inputs a logic of the double-side conveyance sensor 28 to the I/O port 206. The input circuit 214 of the full-state sensor 39 inputs a logic of the full-state sensor 39 to the I/O port 206.

The CPU 201 operates the I/O port 206 the rough the bus 205, and thus drives the reversing solenoid 221. Further, the CPU 201 checks the logic of each of the fixing discharge sensor 20, the double-side conveyance sensor 28, and the full-state sensor 39 by checking a logic of the I/O port 206 via the bus 205.

<Function Block Diagram>

Figure 3:
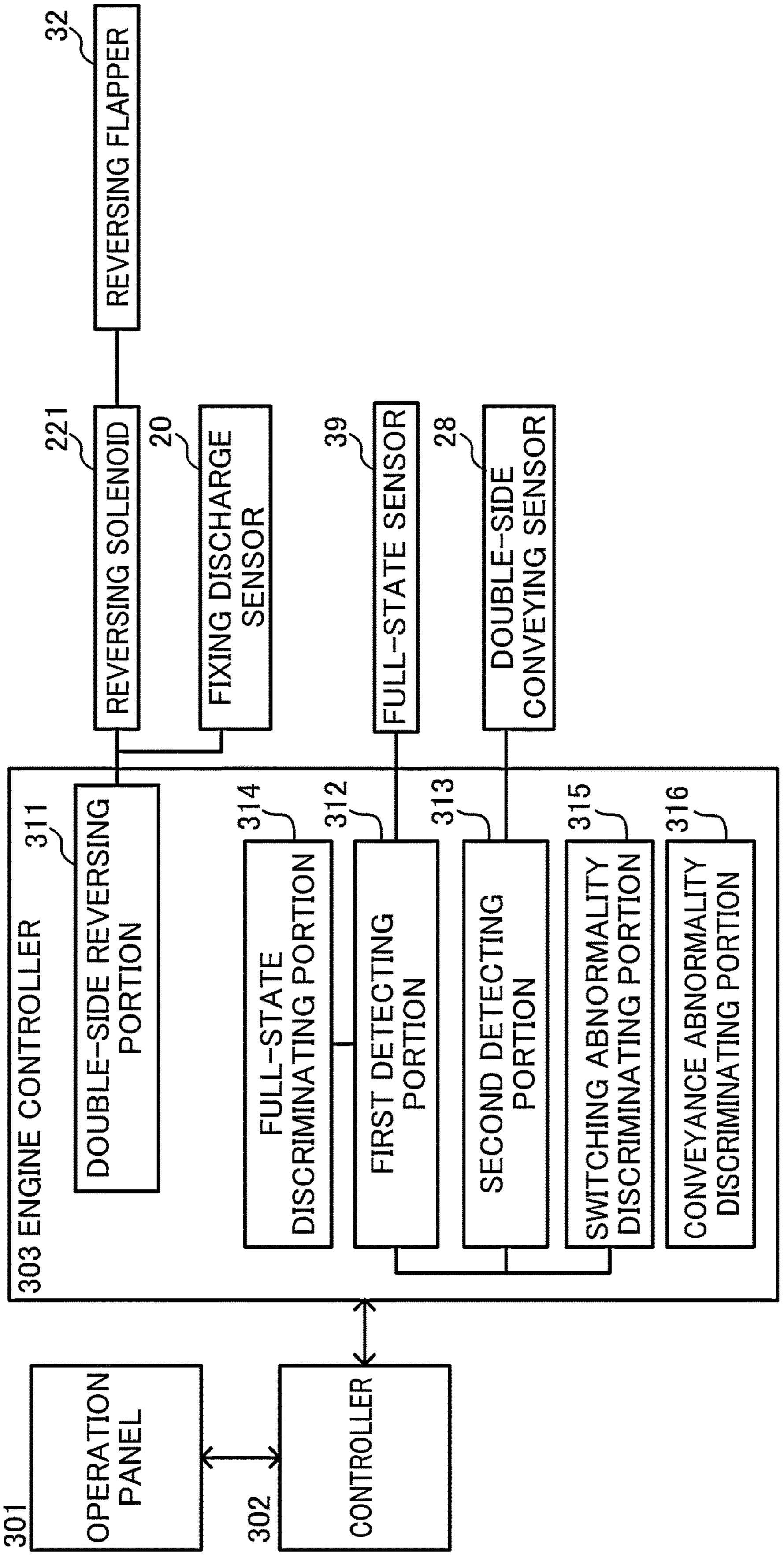
FIG. 3 is a control block diagram.

FIG. 3 is a block diagram showing a function constitution of the embodiment 1. An engine controller 303 as a controller (control unit) has functions of a double-side reversing portion 311, a first detecting portion 312, a second detecting portion 313, a full-state discriminating portion 314, a switching abnormality discriminating portion 315 as a discriminating means, and a conveyance abnormality discriminating portion 316. The double-side reversing portion 311 switches a state of the reversing flapper 32 by controlling the reversing solenoid 221 in accordance with a switching timing determined in advance by using a detection result of the fixing discharge sensor 20 as a starting point. The first detecting portion 312 detects the sheet 2, conveyed to the discharge conveying path 26, by the full-state sensor 39. The second detecting portion 313 detects the sheet 2, conveyed to the double-side conveying path 33, by the double-side conveyance sensor 28. The full-state discriminating portion 314 discriminates whether or not the sheets 2 stacked on the discharge tray 27 are in a full state, from a detection result of the first detecting portion 312.

The switching abnormality discriminating portion 315 discriminates whether or not the conveying path switching portion 36 is abnormal, from detection results of the first detecting portion 312 and the second detecting portion 313. In the case where the second detecting portion 313 does not detect the sheet 2, the conveyance abnormality discriminating portion 316 discriminates whether or not abnormality occurs in conveyance of the sheet 2, depending on a discrimination result of the switching abnormality discriminating portion 318. Further, in the case where the conveyance abnormality discriminating portion 316 discriminates that the abnormality occurred in conveyance of the sheet 2, the conveyance abnormality discriminating portion 316 causes an operation panel 301 through a controller 302 to display information to the effect that abnormality (failure) occurred in the operation panel 301 and to notify the user of the information.

The operation panel 301 functions as a notifying portion notifies the user of various pieces of information by the engine controller 303.

<Conveying Path Switching Mechanism>

Next, the conveying path switching portion 36 in the embodiment 1 will be described. Part (a) of FIG. 4 is a sectional view of the conveying path switching portion 36 and shows a state (first state) in which the reversing flapper 32 is switched so as to guide the sheet 2 in a direction of the discharge conveying path 26. In the following, the state of part (a) of FIG. 4 is also referred to as a state in which the reversing flapper 32 is switched in the direction of the discharge conveying path 26. Part (b) of FIG. 4 shows a state (second state) in which the reversing flapper 32 is switched so as to guide the sheet 2 in a direction of the double-side reversing path 29. In the following, the state of part (b) of FIG. 4 is also referred to as a state in which the reversing flapper 32 is switched in the direction of the double-side reversing path 29. The conveying path switching portion 36 includes the reversing flapper 32, a spring 401, a flapper arm 402, a flapper arm rotation shaft 402*a*, a link arm 403, a link arm rotation shaft 403*a*, and the reversing solenoid 221. The reversing flapper 32 is operated in interrelation with the flapper arm 402.

In the case of part (a) of FIG. 4, the reversing flapper 32 receives a force about the flapper arm rotation shaft 402*a* in the counterclockwise direction by an elastic force of the spring 401, so that the flapper arm 402 is restricted in rotation operation in the counterclockwise direction by the link arm 403. By this, the reversing flapper 32 is in a state in which the reversing flapper 32 guides the sheet 2 in the direction of the discharge conveying path 26. Incidentally, in part (a) of FIG. 4, the reversing solenoid 221 is in an OFF state.

As shown in part (b) of FIG. 4, when the reversing flapper 32 is switched in the direction of the double-side reversing path 29, the reversing flapper 32 receives a signal from the driving circuit 211 for the reversing solenoid 221, so that the reversing solenoid 221 is in an ON state. In the ON state of the reversing solenoid 221, the reversing solenoid 221 attracts the link arm 403 in an arrow N direction. By this, the link arm 403 is rotated about the link arm rotation shaft 403*a*, and thus pushes up the flapper arm 402. The flapper arm 402 is rotated about the flapper arm rotation shaft 402*a* in the clockwise direction, so that the associated reversing flapper 32 is switched in the direction of the double-side reversing path 29. After a free end 32*t* of the reversing flapper 32 reaches a branch position 32*a*. The sheet 2 conveyed is conveyed to the double-side reversing path 29. Here, in the case where a timing when the free end 32*t* of the reversing flapper 32 reaches the branch position 32*a* is earlier than a timing when a leading end of the sheet 2 reaches the branch position 32*a*, the sheet 2 is conveyed to the double-side reversing path 29.

<Switching Abnormality Discrimination Control>

Next, a method of discriminating whether or not the conveying path switching portion 36 is abnormal, by the switching abnormality discriminating portion 315 will be described. FIG. 5 is a timing chart showing a leading end position of the sheet 2, a state of the reversing flapper 32, and changes in state of the driving portion and the detecting portion in the case where for the conveyance of the sheet 2, the switching of the reversing flapper 32 is not in time. More specifically, (i) is a graph showing a time in the abscissa and a position on the conveying path in the ordinate, and in the ordinate, in the order from an upstream side toward a downstream side of the (sheet) conveying direction, a fixing discharge sensor 20 position, the branch position 32*a*, and a full-state sensor 39 position are shown. Incidentally, in the graph, a leading end (paper leading end) and a trailing end (paper trailing end) of the sheet 2 conveyed are also shown. (ii) shows the state of the reversing flapper 32 and shows a time change as whether or not the state in a state in which the reversing flapper 32 is switched to the discharge conveying path 26 (part (a) of FIG. 4) or is a state in which the reversing flapper 32 is switched to the double-side reversing path 29 (part (b) of FIG. 4). (iii) shows a time change in logic (high level or low level) of a signal outputted from the fixing discharge sensor 20, and (iv) shows a time change in logic (ON (high level) or OFF (low level)) of the reversing solenoid 221. (v) shows a time change in logic (high level or low level) of a signal outputted from the full-state sensor 39. Incidentally, outputs of the fixing discharge sensor 20 and the full-state sensor 39 are switched from the low level to the high level when the leading end of the sheet 2 reaches the associated sensor position, and are switched from the high level to the low level when the trailing end of the sheet 2 passes through the associated sensor position.

The sheet 2 passes through the fixing discharge sensor 20, and thereafter is conveyed to the branch position 32*a*. When the time of detection of the leading end of the sheet 2 by the fixing discharge sensor 20 is taken as a starting point A (also referred to as a timing A), the double-side reversing portion 311 turns on (ON) the reversing solenoid 221 at a timing P501 determined in advance, so that the reversing flapper 32 is switched in the direction of the double-side reversing path 29. Here, a timing when the leading end of the sheet 2 reaches the branch position 32*a* is defined as a timing P502, and a timing when the direction of the reversing flapper 32 is switched from the discharge conveying path 26 to the double-side reversing path 29 is defined as a timing P503.

Ordinarily, after the reversing flapper 32 is switched in the direction of the double-side reversing path 29, the sheet 2 reaches the branch position 32*a*. That is, in a normal state, the timing P502 is later than the timing P503. Then, the sheet 2 is conveyed to the double-side reversing path 29, and therefore, is detected by the double-side conveyance sensor 28, and the full-state sensor 39 does not change (does not detect the sheet 2). However, in the case where a manufacturing assembling error or a delay of a drive instruction occurs, the conveying path switching portion 36 requires a time longer than a time in a normal operation until the reversing flapper 32 is switched in the direction of the double-side reversing path 29 in some instances. In this case, as shown in FIG. 5, the timing P502 becomes earlier than the timing P503 in some instances. That is, the sheet 2 reaches the branch position 32*a* before the reversing flapper 32 is switched in the direction of the double-side reversing path 29, and therefore, the sheet 2 is conveyed to the discharge conveying path 26 in some instances. The sheet 2 conveyed to the discharge conveying path 26 is discharged on the discharge tray 27 and is detected by the full-state sensor 39 without being detected by the double-side conveyance sensor 28.

For that reason, the switching abnormality discriminating portion 315 is capable of discriminating whether or not the conveying path switching portion 36 is abnormal, by a change of the full-state sensor 39. The switching abnormality discriminating portion 315 measures the number of times of discrimination that the conveying path switching portion is abnormal (hereinafter, this number of times of discrimination is referred to as discrimination number), and causes the RAM 204 to store the discrimination number in which the conveying path switching portion 36 is discriminated as abnormal. In the case where the discrimination number is not less than a predetermined number Y (predetermined number) determined in advance, the engine controller 303 causes the operation panel 301 to display thereon that the conveying path switching portion 36 is in a failure state, and thus notifies the user of the failure state of the conveying path switching portion 36. In the case where the discrimination number is less than the predetermined number Y (predetermined number), the engine controller 303 causes the operation panel 301 to display thereon that misprint occurs in a process of performing the image forming operation, and thus notifies the user of occurrence of the misprint.

On the other hand, the full-state sensor 39 is positioned in a discharge opening of the discharge conveying path 26, so that the user can touch the full-state sensor 39. When the user removes the sheet(s) 2 stacked on the discharge tray 27, by contact of the sheet(s) 2 with the full-state sensor 39, output of the full-state sensor 39 changes in some instances. In such a case, there is a need to discriminate whether or not the output change of the full-state sensor 39 is a change due to action of the user. The switching abnormality discriminating portion 315 uses a time T in which the sheet 2 is detected by the full-state sensor 39 when whether or not the conveying path switching portion 36 is abnormal is discriminated from the change of the full-state sensor 39. This time T is a time in which the sheet 2 is continuously detected by the full-state sensor 39 within a period from a start of measurement at a timing A to an end of the measurement at a timing B (within a period of B-A). More specifically, the time T is a time from a timing when the full-state sensor 39 is switched from a low level to a high level until a timing when the full-state sensor 39 is switched from the high level to the low level.

As described above, the timing A is a reversing when the leading end of the sheet 2 is detected by the fixing discharge sensor 20, and the timing B is a timing when a predetermined time X has elapsed without detection of the sheet 2 by the double-side conveyance sensor 28. The predetermined time X is a time determined in advance by including a margin in addition to an estimated time that the sheet 2 reaches the double-side conveyance sensor 28. Here, a variation in time T measured will be described. The time T measured is based on a variation factor such as a variation in conveyance time due to a manufacturing assembling error or a variation in sheet feeding operation in addition to a time calculated on the basis of a length of the sheet 2 conveyed and a speed (conveying speed) of the conveyed sheet 2. For that reason, the time T measured changes in a range including the above-described variation factor. This range including the variation factor is a predetermined period Tmin or more and Tmax or less (predetermined period).

In the case where the time T is the predetermined period Tmin or more and Tmax or less (within the predetermined period) (i.e., Tmin≤T≤Tmax), the switching abnormality discriminating portion 315 is capable of discriminating that the change of the full-state sensor 39 is a change due to conveyance of the sheet 2. Therefore, it is possible to discriminate that the sheet 2 was conveyed to the discharge conveying path 26, and therefore, the switching abnormality discriminating portion 315 is capable of discriminating that the conveying path switching portion 36 is abnormal.

On the other hand, in the case where the user removes the sheet(s) 2 stacked on the discharge tray 27, the time T measured is shorter than a time Tmin in general (T<Tmin), and therefore, the switching abnormality discriminating portion 315 can discriminate that the conveying path switching portion 36 is not abnormal. Further, in the case where the sheets 2 stacked on the discharge tray 27 are in a full state, the full-state sensor 39 continuously detects the sheet 2. For that reason, the time T measured is longer than a time Tmax (T>Tmax), so that the switching abnormality discriminating portion 315 can discriminate that the change in time T is not a change due to the conveyance of the sheet 2.

<Conveyance Abnormality Discriminating Control>

Next, the conveyance abnormality discriminating portion 316 for discriminating conveyance abnormality depending on a discrimination result of the switching abnormality discriminating portion 315 will be described. The conveyance abnormality discriminating portion 316 notifies the conveyance abnormality in the case where the sheet 2 conveyed to the double-side reversing path 29 is not detected by the double-side conveyance sensor 28 after a lapse of the predetermined time X. However, as described above, also, in the case where the conveying path switching portion 36 is abnormal, the sheet 2 cannot be detected by the double-side conveyance sensor 28. In this case, the user checks the conveying path after being notified of the conveyance abnormality, but the sheet 2 does not exist in the double-side conveying path 33, and therefore, this results in erroneous detection by the conveyance abnormality discriminating portion 316. Therefore, in the embodiment 1, the conveyance abnormality discriminating portion 316 prevents the erroneous detection by not notifying the user of the conveyance abnormality in the case where the switching abnormality discriminating portion 315 discriminated that the conveying path switching portion 36 is abnormal.

<Flow Relating to Abnormality Discriminating Control>

FIG. 6 is a flowchart relating to the switching abnormality discriminating portion 315. In step (hereinafter, referred to as "S") 601, the engine controller 303 discriminates whether or not the fixing discharge sensor 20 detects the sheet 2, i.e., whether or not the sheet 2 reaches the fixing portion 13. The engine controller 303 causes processing to go to S602 in the case where the engine controller 303 discriminated in S601 that the sheet 2 reaches the fixing portion 13, and causes the processing to return to S601 in the case where the engine controller 303 discriminated in S601 that the sheet 2 does not reach the fixing portion 13. Incidentally, a timing when the leading end of the sheet 2 is detected by the fixing discharge sensor 20 is the above-described timing A.

In S602, the engine controller 303 discriminates whether or not a designated destination of the sheet 2 is the double-side reversing path 29. The engine controller 303 causes the processing to go to S603 in the case where the engine controller 303 discriminated in S602 that the destination of the sheet 2 is the double-side reversing path 29, and causes the processing to be ended in the case where the engine controller 303 discriminated in S602 that the destination of the sheet 2 is not the double-side reversing path 29.

In s603, the engine controller 303 switches the direction of the reversing flapper 32 to a direction of the double-side reversing path 29 by the double-side reversing portion 311. In S604, the engine controller 303 causes the timer 202 to start measurement of the time T in which the sheet 2 is detected by the full-state sensor 39. In S605, the engine controller 303 discriminates whether or not the predetermined time X has elapsed with the processing of S601 as a starting point, by the conveyance abnormality discriminating portion 316. The engine controller 303 causes the processing to return to S605 in the case where the engine controller 303 discriminated in S605 that the predetermined time X has not elapsed, and causes the processing to go to S606 in the case where the engine controller 303 discriminated in S605 that the predetermined time X has elapsed. A timing when the predetermined time X has elapsed corresponds to the above-described timing B.

In S606, the engine controller 303 ends the measurement of the time T started in S604. In S607, the engine controller 303 discriminates whether or not the sheet 2 is undetected (not detected) by the double-side conveyance sensor 28, by the conveyance abnormality discriminating portion 316. The engine controller 303 causes the processing to go to S608 in the case where the engine controller 303 discriminated in S607 that the sheet 2 is not detected, and causes the processing to be ended since the sheet 2 is normally conveyed to the double-side conveying path 33 in the case where the engine controller 303 discriminated in S607 that the sheet 2 is detected. Incidentally, in the case where the sheet 2 is detected in S607, the engine controller 303 may discriminate that the user touched the discharge tray 27 in the case where the measured time T is used and is less than the time Tmin (T<Tmin). Further, the engine controller 303 may discriminate that the sheets 2 stacked on the discharge tray 27 are in the full state in the case where the measured time T is longer than the time Tmax (T>Tmax).

In S608, the engine controller 303 discriminates whether or not the time T in which the sheet 2 is detected by the full-state sensor 39 fills within the predetermined period Tmin or more and Tmax or less (Tmin≤T≤Tmax). The engine controller 303 causes the processing to go to S609 in the case where the engine controller 303 discriminated in S608 that the time T falls within the predetermined period Tmin or more and Tmax or less, and causes the processing to go to S614 in the case where the engine controller 303 discriminated in S608 that the time T does not fall within the predetermined period Tmin or more and Tmax or less.

In S609, the engine controller 303 causes the switching abnormality discriminating portion 315 to discriminate that the conveying path switching portion 36 is abnormal. In S610, the engine controller 303 causes the switching abnormality discriminating portion 315 to cause the RAM 204 to store the discrimination number measured by the switching abnormality discriminating portion 315. At this time, the conveyance abnormality discriminating portion 316 does not detect the sheet 2 by the double-side conveyance sensor 28, but the conveyance abnormality discriminating portion 316 does not notify the user of the occurrence of the abnormality of the conveyance.

In S611, the engine controller 303 discriminates whether or not the discrimination number (of times) stored in S610 is a predetermined number Y or more. The engine controller 303 causes the processing to go to S612 in the case where the engine controller 303 discriminated in S611 that the discrimination number (of times) is the predetermined number Y or more. In S612, the engine controller 303 causes the operation panel 301 to notify the user of a failure state of the conveying path switching portion 36, and then ends the processing. The engine controller 303 causes the processing to go to S613 in the case where the engine controller 303 discriminated in S611 that the discrimination number (of times) is less than the predetermined number Y. In S613, the engine controller 303 causes the operation panel 301 to notify the user of occurrence of misprint, and then ends the processing.

In the case where the time T does not fall within Tmin or more and Tmin or less, the engine controller 303 causes the conveyance abnormality discriminating portion 316 to discriminate that the sheet 2 remains on a conveying path from the fixing discharge sensor 20 to the double-side conveyance sensor 28. In S614, the engine controller 303 notifies the user of that the abnormality of the conveyance occurs, and then ends the processing.

As described above, according to the embodiment 1, even in a constitution in which the user can touch the sensor in the destination of the conveying path, abnormality discrimination of the conveying path switching portion can be properly carried out. Incidentally, in the embodiment 1, as one of the plurality of conveying paths, the double-side reversing path was described as an example, but the conveying path is not limited to the double-side reversing path, and the plurality of conveying paths may also be a discharge opening provided to the image forming apparatus and a conveying path toward a post-processing apparatus. Further, in the embodiment 1, the conveying path switching portion of the laser beam printer was described, but the present invention is not limited thereto, and is applicable to a general sheet (paper) conveying apparatus including a conveying path switching portion for switching a conveying path on a sheet conveying passage.

As described above, according to the embodiment 1, even in a constitution in which a switching mechanism for conveying sheets to a plurality of conveying paths is provided and in which the user can touch a sensor for a destination of the associated conveying path, it is possible to prevent erroneous detection of abnormality of the switching mechanism without increasing a cost such as addition of hardware.

Embodiment 2

Next, an embodiment 2 to which the present invention is applicable will be described. In the embodiment 2, in the case where the conveying path switching portion 36 is abnormal, control for conveying the sheet 2 to the double-side reversing path by engine control will be described.

Incidentally, parts identical to those in the embodiment 1 will be omitted from description by using the same reference numerals or symbols.

<Control Carried Out During Abnormality of Switching Portion>

Control for conveying the sheet 2 to the double-side reversing path 29 by the engine control in the case where the conveying path switching portion 36 is abnormal will be described. FIG. 7 is a timing chart showing a leading end position of the sheet 2, a state of the reversing flapper 32, and state changes of the driving portion and the detecting portion when a discrimination number in which the conveying path switching portion 36 is discriminated as being abnormal is less than a predetermined number Z, and FIG. 8 is a timing chart showing the leading end position of the sheet 2, the state of the reversing flapper 32, and the state changes of the driving portion and the detecting portion when the discrimination number in which the discrimination number is the predetermined number Z or more. In each of FIGS. 7 and 8, (i) to (v) are similar to (i) to (v) of FIG. 5. In the embodiment 2, description will be made by defining the predetermined number Z as once (Z<Y). Further, a conveyance destination of a sheet 2 (paper) is the discharge conveying path 26, and a conveyance destination of a subsequent sheet 2 (subsequent paper) is the double-side reversing path 29.

(Discrimination Number: Less than Predetermined Number Z (FIG. 7))

First, control for conveying the sheet 2 to the double-side reversing path 29 in the case where the discrimination number in which the conveying path switching portion 36 is discriminated as being abnormal is less than the predetermined number Z and it takes more time than in a normal operation until the reversing flapper 32 is switched will be described using FIG. 7. In the case of FIG. 7, the discrimination number is 0 times and is less than the predetermined number Z, and therefore normal printing is started. The sheet 2 (preceding the subsequent sheet 2) reaches a position of the fixing discharge sensor 20, so that logic of the fixing discharge sensor 20 becomes ON, and then the sheet 2 passes through the branch position 32*a* and a position of the full-state sensor 39.

Next, the subsequent sheet 2 is conveyed subsequently to the sheet 2. Here, an interval in which a trailing end of the sheet 2 and a leading end of the subsequent sheet 2 are detected in the position of the fixing discharge sensor 20 is an interval T701. The discrimination number is less than the predetermined number Z, and therefore, the double-side reversing portion 311 turns on the reversing solenoid 221 at a timing P702 determined in advance with a time, as a starting point, when the subsequent sheet 2 is detected by the fixing discharge sensor 20. After the reversing solenoid 221 is turned on, the reversing flapper 32 is switched in the direction of the double-side reversing path 29. Here, a timing when the subsequent sheet 2 reaches the branch position 32*a* is defined as a timing P703, and a timing when the direction of the reversing flapper 32 is switched from the discharge conveying path 26 to the double-side reversing path 29 is defined as a timing P704.

Also, as described in the embodiment 1, in the case where the manufacturing assembling error or the delay of the drive instruction occurs, in the conveying path switching portion 36, it takes more time than in the normal operation until the reversing flapper 32 is switched in the direction of the double-side reversing path 29 in some instances. In this case, the timing P703 becomes earlier than the timing P704 in some instances, and the subsequent sheet 2 is detected by the full-state sensor 39 after being conveyed to the discharge conveying path 26. Here, similarly as in the embodiment 1, the switching abnormality discriminating portion 315 discriminates that the subsequent sheet 2 is conveyed to the discharge conveying path 26, on the basis of a change of the full-state sensor 39. For that reason, the switching abnormality discriminating portion 315 discriminates that the conveying path switching portion 36 is abnormal. Here, the discrimination number=1) in which the conveying path switching portion 36 is discriminated as being abnormal is stored in the RAM 204, but onto the operation panel 301, occurrence of misprint is notified, so that the user is prompted to carry out the printing again.

(Discrimination Number: Predetermined Number Z or More (FIG. 8))

Next, control for conveying the subsequent sheet 2 to the double-side reversing path 29 in the case where the discrimination number in which the conveying path switching portion 36 is discriminated as being abnormal is the predetermined number Z or more and it takes more time than in a normal operation until the reversing flapper 32 is switched will be described using FIG. 8. Here, after execution of processing of FIG. 7, i.e., the number of times of discrimination of the abnormality is once, and the predetermined number Z is once.

In the case of FIG. 8, the discrimination number in which the conveying path switching portion 36 is discriminated as being abnormal is once, and is the predetermined number Z or more, and therefore, the engine controller 303 increases an interval in which the image is printed on the sheet 2 more than in the normal operation. Here, an interval in which a trailing end of the sheet 2 and a leading end of the subsequent sheet 2 are detected in the position of the fixing discharge sensor 20 is an interval T705. The interval T705 is determined as to be longer than the interval T701 (T705>T701).

The discrimination number is the predetermined number Z or more, and therefore, the double-side reversing portion 311 turns on the reversing solenoid 221 at a timing P706 earlier than a timing P702 determined in advance. This timing P706 is determined so that the reversing flapper 32 is switched earlier than the sheet 2 conveyed reaches the branch position 32*a* in the case where it takes more time than in the number operation until the reversing flapper 32 is switched in the direction of the double-side reversing path 29. As an example, the timing P706 is set earlier than the timing P702 by 10 msec when a distance from the position of the fixing discharge sensor 20 to the branch position is 40 mm and a conveying speed of the sheet 2 is 100 mm/sec.

After the reversing solenoid 221 is turned on, the reversing flapper 32 is switched in the direction of the double-side reversing path 29. Here, a timing when the subsequent sheet 2 reaches the branch position 32*a* is defined as a timing P707, and a timing when the direction of the reversing flapper 32 is switched from the discharge conveying path 26 to the double-side reversing path 29 is defined as a timing P708. Compared with an ordinary case, the reversing flapper 32 is switched at a timing P708 earlier than a timing P707 when the sheet 2 reaches the branch position 32*a*. Further, by the interval T705, an interval between the sheet 2 and the subsequent sheet 2 is increased, and therefore, the reversing flapper 32 is not switched earlier than a timing P709 when the trailing end of the sheet 2 (preceding the subsequent sheet 2) passes through the branch position. In other words, the timing P709 is a timing earlier than the timing P708. For that reason, the timing P707 is later than the timing P708. Therefore, the subsequent sheet 2 is conveyed to the double-side reversing path 29. The subsequent sheet 2 is not conveyed to the discharge conveying path 26 on a side downstream of the branch position 32*a*, and therefore, a position of the subsequent sheet 2 in FIG. 8 is indicated by a broken line.

Therefore, even in the case where it takes more time than in the normal operation due to the abnormality of the conveying path switching portion 36 until the reversing flapper 32 is switched, the subsequent sheet 2 can be conveyed to the double-side reversing path 29 by the engine control.

<Flowchart of Control Carried Out During Abnormality of Conveying Path Switching Portion>

FIG. 9 is a flowchart relating to control for conveying the sheet 2 to the double-side reversing path 29 by the engine control in the case where the conveying path switching portion 36 is abnormal. The case where the discrimination number stored in the RAM 204 is 0, the predetermined number Y is 2, and the predetermined number Z is 1 will be described using this flowchart.

In S801, the engine controller 303 discriminates whether or not the engine controller 303 receives a print instruction from the controller 302. The engine controller 303 causes processing to return to S801 in the case where the engine controller 303 discriminated in S801 that the engine controller 303 does not receive the print instruction, and causes the processing to go to S802 in the case where the engine controller 303 discriminated in S801 that the engine controller 303 receives the print instruction. In S802, the engine controller 303 acquires the discrimination number (of times) which is stored in the RAM 204 and in which the conveying path switching portion 36 is discriminated as being abnormal, and then discriminates whether or not the acquired discrimination number (of times) is less than the predetermined number Z. In the case where the engine controller 303 discriminated in S802 that the discrimination number (of times) is less than the predetermined number Z, the engine controller 303 causes the processing to go to S804. In S804, the engine controller 303 starts print(ing). By this, the sheet 2 is conveyed.

Incidentally, S805 and S806 are processing similar to the processing of S601 and S602 of FIG. 6, and therefore, will be omitted from description.

In S806, in the case where the conveying destination of the sheet 2 is the double-side reversing path 29, in S807, the engine controller 303 discriminates whether or not the discrimination number (of times) which is stored in the RAM 204 and in which the conveying path switching portion 36 is discriminated as being abnormal is less than the predetermined number Z. The engine controller 303 causes the processing to go to S809 in the case where the engine controller 303 discriminated in S807 that the discrimination number (of times) is less than the predetermined number Z. In the case where the discrimination number stored in the RAM 204 is 0, the above-described processing is performed. Incidentally, processing from S809 to S820 is similar to the processing of S603 to S614 of FIG. 6, and therefore will be omitted from description. Incidentally, in S819, in the case where the discrimination number is less than the predetermined number Y, the engine controller 303 causes the operation panel 301 to notify the user of occurrence of misprint and thus to prompt the user to carry out printing again.

In the case where the engine controller 303 discriminated in S802 that the discrimination number (of times) stored in the RAM 204 is the predetermined number Z or more, the engine controller 303 causes the processing to go to S803. In S803, the engine controller 303 delays a print start timing and causes the processing to go to S804. By this, an interval between the trailing end of the sheet 2 (preceding the subsequent sheet 2) and the leading end of the subsequent sheet 2 can be increased more than an interval determined in advance.

In the case where the engine controller 303 discriminated in S807 that the discrimination number (of times) stored in the RAM 204 is the predetermined number Z or more, the engine controller 303 causes the processing to go to S808. In S808, the engine controller 303 determines a switching timing so as to advance the switching timing, determined in advance, of the reversing flapper 32 by the double-side reversing portion 311, and causes the processing to go to S809. By this, the double-side reversing portion 311 switches the reversing flapper 32 in the direction of the double-side reversing path 29 in accordance with the timing determined in S808. In the case where the discrimination number stored in the RAM 204 is 1, the above-described processing is performed. By performing the processing of S803 and S808, the reversing flapper 32 is switched earlier than the subsequent sheet 2 reaches the branch position 32*a*. For this reason, in S813, the double-side conveyance sensor 28 detects the sheet 2, so that the control is ended.

As described above, according to the embodiment 2, even in the case where the conveying path switching portion is abnormal, the sheet can be conveyed to the double-side conveying path. Further, in this embodiment, the conveying path switching portion of the laser beam printer was described, but the present invention is not limited thereto, and is applicable to all of sheet (paper) conveying devices each including a conveying path switching portion for switching a conveying path on a sheet conveying path.

As described above, according to the embodiment 2, even in a constitution in which the switching mechanism for conveying the sheet to the plurality of conveying paths is provided and in which the user can touch the sensor in the conveying path destination, it is possible to prevent erroneously detection of the abnormality of the switching mechanism without increasing a cost such as addition of hardware.

Other Embodiments

The present invention can also be realized in processing in which a program for realizing one or more functions of the above-described embodiments is supplied to a system or an apparatus (device) via a network or a storing medium and in which one or more processors in a computer of the system or the apparatus read and execute the program. Further, the present invention can also be realized by a circuit (for example, ASIC) for realizing one or more functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-192795 filed on Nov. 13, 2023, which is hereby incorporated by reference herein in its entirety.

What is claimed is:

1. An image forming apparatus comprising:

a first conveying portion having a discharge opening and configured to convey a recording medium;

a second conveying portion configured to convey the recording medium in a direction different from a direction by the first conveying portion;

a switching unit configured to switch between (1) a first state in which the recording medium is guided to the first conveying portion and (2) a second state in which the recording medium is guided to the second conveying portion;

a detecting unit provided in the discharge opening and configured to detect the recording medium;

a controller configured to control the switching unit;

a discriminating unit configured to discriminate that the switching unit is abnormal in a case where after the switching unit is controlled by the controller so as to be switched to the second state, a time from a start of detection of the recording medium by the detecting unit to an end of the detection is within a predetermined period; and a notifying portion configured to provide a notification regarding the switching unit, wherein the discriminating unit is further configured to (1) count a number of occurrences of the abnormality discrimination of the switching unit and (2) notify the notifying portion that the switching unit is in a failure state when the number of occurrences reaches a predetermined threshold.

2. An image forming apparatus according to claim 1, wherein the predetermined period is determined based on (1) a length of the recording medium in its conveying direction and (2) a conveying speed of the recording medium.

3. An image forming apparatus according to claim 1, wherein the notifying portion provides a notification that the switching unit is in a failure state when the switching unit is discriminated as being abnormal by the discriminating unit.

4. An image forming apparatus according to claim 1, wherein the notifying portion notifies that a misprint may occur during an image forming operation when the number of occurrences of the abnormality discrimination is less than the predetermined predetermined threshold.

5. An image forming apparatus according to claim 1, wherein when the switching unit is discriminated as being abnormal, the discriminating unit controls a timing of switching to the second state to be earlier than a preset timing.

6. An image forming apparatus according to claim 5, wherein when the switching unit is discriminated as being abnormal, the discriminating unit increases an interval of feeding the recording medium as compared to a preset interval.

7. An image forming apparatus according to claim 1, wherein the second conveying portion turns the recording medium upside down while conveying.

8. An image forming apparatus according to claim 7, further comprising:

a third conveying portion configured to convey the recording medium turned upside down by the second conveying portion; and a second detecting unit provided in the third conveying portion and configured to detect the recording medium, wherein after the switching unit is switched to the second state, the discriminating unit discriminates whether the switching unit is abnormal when the recording medium is not detected by the second detecting unit.

9. An image forming apparatus according to claim 8, wherein the discriminating unit discriminates that an abnormality occurs in conveyance of the recording medium when the recording medium is not detected by the second detecting unit and a time from a start of detection by the first detecting unit to an end of detection is not within the predetermined period.

* * * * *